Dec. 14, 1954   G. S. STAMATOFF   2,697,053
METHOD OF COATING A SHEET OF POLYVINYL BUTYRAL RESIN
AND LAMINATING SAID SHEET BETWEEN GLASS PLATES
Filed April 25, 1951                           2 Sheets-Sheet 1
FIG. I.
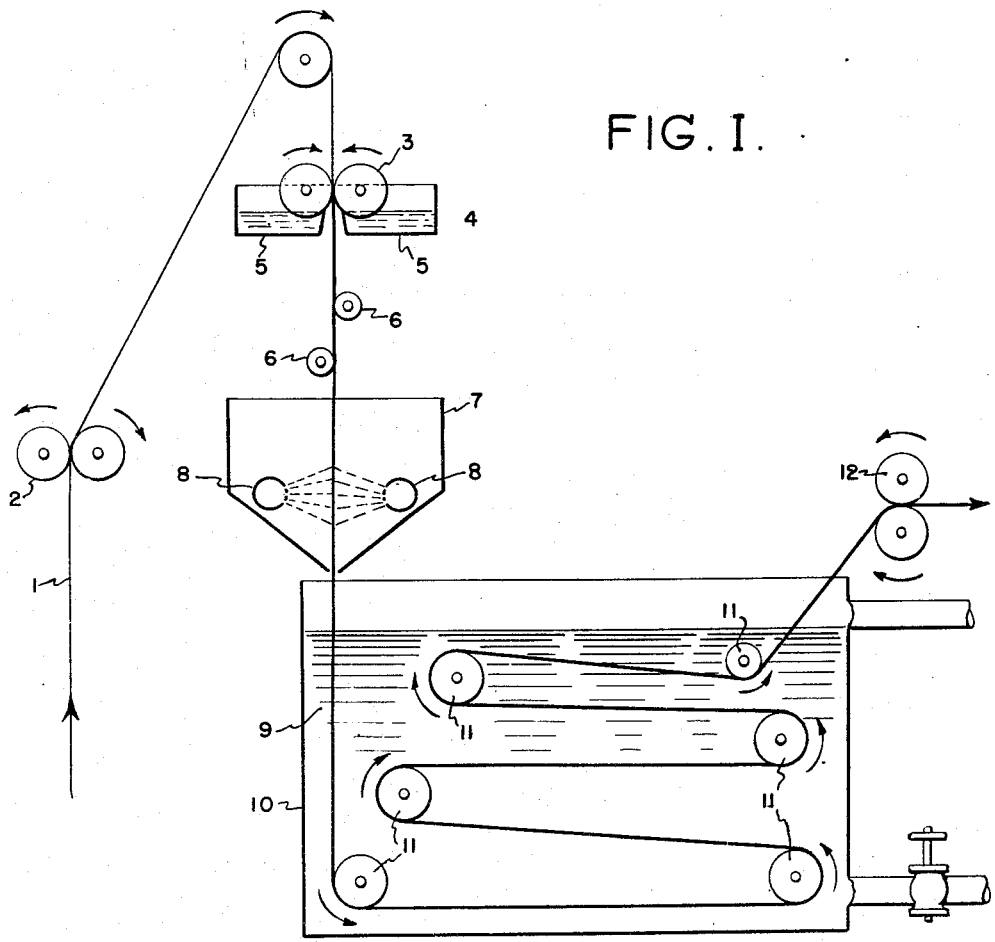
INVENTOR:
GELU S. STAMATOFF
BY
*A. McAlevy*
ATTORNEY.

FIG. II.

United States Patent Office 2,697,053
Patented Dec. 14, 1954

2,697,053

METHOD OF COATING A SHEET OF POLYVINYL BUTYRAL RESIN AND LAMINATING SAID SHEET BETWEEN GLASS PLATES

Gelu S. Stamatoff, Newark, Del., assignor to E. I. du Pont de Nemours and Company, Wilmington, Del., a corporation of Delaware Application April 25, 1951, Serial No. 222,858

2 Claims. (Cl. 154—2.77)

This invention relates to a method for producing a roughened surface on polymeric sheet materials, and more particularly to a method for producing a roughened surface on sheet materials to be used as safety glass interlayers. This application is a continuation-in-part of my copending application S. N. 45,013, filed August 19, 1948, now abandoned.

In the manufacture of safety glass it has been customary heretofore to employ as a polymeric interlayer a sheet material which has been embossed or roughened mechanically. This was made necessary by the tendency of smooth surfaced interlayers to adhere to adjoining surfaces during subsequent operations. For example, a common practice has been to ship the safety glass interlayer sheet in the form of rolls, and to avoid adhesion of adjoining surfaces within the rolls these surfaces were mechanically roughened and a fine powdery material (which could be readily removed) such as sodium bicarbonate was employed to separate the layers of sheet material. In the laminating plant the powdery material could be washed away, and the roughened sheets could be stacked up for use in the laminating operation without too much danger that adjoining sheets would become adhesively bonded to one another. When smooth surfaces were employed considerable trouble was encountered due to the sticking together of the polymeric surfaces during shipment and during the laminating plant operation.

Heretofore the surface roughening effect has been achieved by passing the safety glass interlayer sheets through the nip of embossing rolls. The method has been entirely satisfactory, except that it has been rather difficult to adapt it to continuous production of the interlayer sheets. This in turn was due to the fact that it was necessary to soften the surfaces of the interlayer sheets, e. g. by heating with steam, prior to passing the sheets between the embossing rolls.

An object of this invention is to provide safety glass interlayer material having roughened surfaces without the use of embossing rolls. Other objects of the invention will appear hereinafter.

The objects of the invention are accomplished by coating a polymeric sheet material with a liquid comprising an organic film-forming substance and a solvent therefor, and, while the said coating is still in a soft condition, causing droplets of liquid to impinge thereupon, said liquid being miscible with the said solvent, said liquid being also a non-solvent for the organic film-forming material. In this manner a continuous coating is obtained on the base sheet and the surface of this continuous coating is roughened by the action of he impinging particles of liquid. To harden the product thus obtained it is desirable to immerse the film in a liquid which leaches out the remaining quantities of organic solvent without dissolving any of the polymeric constituents and without leaching away any substantial amount of plasticizer (in those cases in which a plasticizer is employed).

Any suitable safety glass interlayer polymeric material may be employed as a base sheet in the practice of the invention. The coatings on the base sheet may be made of the same polymeric material or a different polymeric material.

The manner of carrying out the method of this invention is obviously subject to wide variations, and it will be influenced to some extent by the base material on which the coating to be embossed (i. e. roughened) is deposited. In general, safety glass interlayer materials are flexible sheets which can be made to adhere directly or indirectly to glass.

The invention can be illustrated by reference to the accompanying drawing wherein:

Figure 1 shows more or less diagrammatically a side elevation of an apparatus for carrying out the present invention.

Referring to Figure 1, reference numeral 1 designates a flexible sheet such as a sheet of polyvinyl butyral resin used in safety glass, such sheets conveniently being made by extrusion polymer of the polymeric material through an orifice into a chilled seasoning bath and then passed through a series of seasoning trays to remove the solvent used to facilitate the extrusion. The sheet 1 then passes through the squeeze rolls 2 to remove excess moisture and then through the coating rolls 3 disposed in the liquid coating composition 4 held in trays 5. This coating composition will comprise an organic film-forming substance and a liquid solvent, other, ingredients, if any, being of no particular concern here. Smoothing bars 6 are provided to insure a uniform distribution of the coating across the sheet 1.

The sheet 1 next passes into the spray hood 7 and is sprayed by a liquid emerging from the nozzles 8, such liquid being miscible with the solvent in the coating composition 4 and the rate of travel through sheet 1 being adjusted so that the coating on the sheet retains its roughened surface as it emerges from the hood 7. These nozzles 8 do not merely produce a mist but are so adjusted that they produce droplets of the liquid which impinge forcefully against the coating, thereby producing valleys or indentations in the same. A multiplicity of such nozzles may be used if desired. Thereafter the sheet 1, which is now coated with a continuous roughened coating, passes into the seasoning liquid 9 in the tank 10, traveling over idler rolls 11 until leaching of the organic solvent is substantially complete. Sheet 1 then passes through the squeeze rolls 12 and thence to a drier, not illustrated.

Other means may be employed for applying the coating as this is not a critical part of the present invention. The coating may be applied by first dipping the sheeting into a coating solution and then pressing the sheet between bars spaced to strip excess coating from the sheet. The coating may also be applied by spraying or brushing, but it is preferred to use smoothing bars in order to assure uniform distribution of the coating on the surface of the sheet. While a seasoning tank and seasoning liquid have been illustrated in the drawing, the coated sheet may be passed directly from the spray stage to drying ovens. Clearly, if the base sheet is relatively rigid, modification of the illustrated apparatus would be necessary.

It is generally desirable to employ a plasticizer in combination with the base material, as there are relatively few base materials which are sufficiently flexible in the absence of a plasticizer. Similarly, it is generally desirable to employ a plasticizer as one of the ingredients of the coating dope. When the coating material is one which requires a plasticizer it should preferably be introduced in this manner, although migration of plasticizer from the base material to the polymeric material employed as a coating can also be used as a method for plasticizing the coating provided a sufficient quantity of plasticizer is initially present in the base material.

The following examples wherein all parts are by weight unless otherwise noted, illustrate specific embodiments of the invention.

Example I

The following materials were used: A sheet 15 mils thick composed of 30 parts di(butoxy ethyl) adipate as plasticizer and 70 parts polyvinyl butyral resin of the following constitution: ester content calculated as polyvinyl acetate 0.5%; hydroxyl content calculated as polyvinyl alcohol 19.0%; acetal content calculated as polyvinyl butyral 80.5%. A coating solution consisting of 94.5 parts ethyl alcohol and 5.5 parts of an organic plastic composition composed of 25 parts (di(butoxy ethyl) adipate as plasticizer and 75 parts polyvinyl butyral resin of the following constitution: ester content calculated as polyvinyl acetate 0.5%; hydroxyl content calculated as polyvinyl alcohol 11.5%; acetal content calculated as polyvinyl butyral 82%.

The sheet was soaked in water for four hours in order to saturate it. Excess water was removed from the surface and the sheet was coated on each side by dipping in the coating solution. The excess coating solution was removed by passing the sheet between two parallel spaced bars 20 mils apart, thus leaving on each side of the sheeting approximately a 2.5 mil coating. The coated sheeting was sprayed with water using a shower type sprayer for about ten seconds. The coated sheeting was seasoned in water for one-half hour and dried at 53° C. for two hours.

The sheeting after drying was uniformly embossed on each side and was non-tacky. Sheeting coated with the same solution and seasoned but not embossed was tacky.

The same procedure was repeated without presoaking the sheet and the results obtained were equivalent to that above.

*Example II*

The following materials were used: A sheet as in Example I and fifty feet long, sixteen inches wide. A coating solution consisting of 86 parts ethyl alcohol and 14 parts of the organic plastic composition of Example I.

The sheet was soaked in water one hour, surface dried, and coated with the coating solution by means of coating rolls spaced 25 mils apart. The coating was smoothed by means of parallel bars spaced 20 mils apart, thus forming a uniform coating on either side of the sheet approximately 2.5 mils in thickness. The sheeting was sprayed at once on both sides with water by means of water spray nozzle, and the spray area and rate of sheet travel adjusted so that each portion of the sheet was sprayed at least five seconds. The coated sheet was seasoned in water for 7 minutes and dried in an air circulating oven at 160° C. for 30 minutes.

The dried sheet had an embossed pattern of remarkable uniformity on each side and was non-tacky. A control sheet which had been coated but not embossed was tacky. The coated embossed sheet was laminated between glass plates using normal laminating conditions, and no difficulties were encountered with sticking to the glass prior to the bonding step. After bonding of the elements, clear laminations were obtained particularly useful as automotive safety glass and of exceptional strength.

*Example III*

The following materials were used: A sheet fifteen mils thick composed of 25 parts di(butoxy ethyl) adipate as plasticizer, and 75 parts polyvinyl butyral resin of the following constitution: ester content calculated as polyvinyl acetate 0.5%; hydroxyl content calculated as polyvinyl alcohol 19%; acetal content calculated as polyvinyl butyral 80.5%. A coating solution consisting of 90 parts ethyl alcohol and 10 parts of an organic plastic composition composed of the same ingredients used in the sheet above.

The sheet was soaked in water two hours and the excess water was removed with squeeze rolls. The coating solution was applied to both sides of the sheet in an apparatus as illustrated in Fig. 1 wherein the coating rolls were spaced 25 mils. The coating was smoothed by staggered stationary bars on each side of the sheet, and was embossed by spraying with water through nozzles providing a fine spray. The rate of travel of the sheet was such that each portion of the surface of the coated sheet was sprayed about one-half of a second. The sheet was then passed directly into a seasoning tank containing water and seasoned for fifteen minutes, and then dried at 60° C. in a circulating air drier for one-half hour.

The surface of the sheeting was uniformly embossed and was characterized by a pebbled surface; it appeared translucent and was non-tacky. The coating on this sheet actually became a part of the sheet and, in effect, the sheet was unmodified except for its surface configuration. In contrast, both the unembossed coated and uncoated sheets were tacky.

*Example IV*

The following materials were used: A three ounce per yard poplin textile having a thread count about 40 x 40. A coating solution consisting of 73 parts methyl ethyl ketone and 27 parts of an organic plastic composition composed of 30 parts of dibutyl phthalate as plasticizer and 100 parts of a copolymer of vinyl chloride and vinyl acetate of the following constitution: polyvinyl chloride—95%; polyvinyl acetate—5%.

The textile was coated on one side with the coating solution by being passed around a roll disposed in a tray filled with the coating solution. A doctor-knife parallel to the roll was spaced to give a coating thickness of 15 mils on the textile. The coated textile was drawn over a stationary smoothing bar and the coating immediately thereafter sprayed with a fine spray of water particles. The coated textile was then passed into a tank containing water and seasoned for 20 minutes, and thereafter dried in an air circulating oven.

The textile coating had a rich satiny luster and the coated textile was suited for manufacture of raincoats and other articles. In contrast, an unembossed textile coating prepared from the same materials was glossy.

*Example V*

The following materials were used: A six ounce per yard glass fiber textile having a thread count about 42 x 32. A coating solution consisting of 40 parts toluene, 40 parts methyl ethyl ketone, and 20 parts of an organic plastic composition composed of a copolymer of vinyl chloride and vinyl acetate having the following constitution: polyvinyl chloride—87%; polyvinyl acetate—13%.

The textile was coated by dipping in the coating solution and excess coating solution was removed by passing the textile between two parallel spaced bars 27 mils apart, thus leaving on each side of the textile approximately a 10 mil coating. The coated textile was immediately thereafter sprayed with methyl alcohol and then passed into a tank containing methyl alcohol where it was seasoned for eight minutes. Excess methyl alcohol was removed by means of an air knife and the coated textile dried in an air circulating oven.

The textile coating had a uniformly embossed surface.

*Example VI*

The following materials were used: A sheet of aluminum foil 5 mils thick. A coating composition consisting of 75 parts acetone and 25 parts of an organic plastic composition composed of a glycol maleate resin prepared by heating 98 parts maleic anhydride and 68 parts ethylene glycol in an inert atmosphere for 11 hours at 200° C.

A 10 mil thickness of the coating solution was applied to the aluminum foil by means of spraying and distribution of the coating made uniform by means of a smoothing bar. Immediately thereafter the coating was sprayed with water using a shower-type sprayer giving a fine spray for about one minute. The coated aluminum foil was then placed in a circulating air oven and dried for one-half hour at 75° C. The film was then baked at 100° C. for 3 hours. The foil coating had a uniformly embossed surface.

*Example VII*

A moist polyvinyl butyral sheet having a thickness of 0.014 inch, and containing 45 parts of di(butoxyethyl)-adipate plasticizer per 100 parts of resin (ester content calculated as polyvinyl acetate, 0.5%; hydroxyl content calculated as polyvinyl alcohol, 19%) is prepared. Without removal of the water which becomes associated with the resin during its preparation, the sheet is coated evenly with 10% solution of the same polyvinyl butyral in ethanol, no plasticizer being present in the solution. The coated sheeting is subjected to the action of a shower of fine water droplets which impinge forcefully upon the soft coating causing indentations therein. The sheeting is then washed free of ethanol and dried. It has a thickness of 0.015 inch, with an uneven surface, as shown in the accompanying drawing, Figure 2. The break strength of the coated sheet is the same as that of the original untreated sheet, and the plasticizer is distributed throughout the entire mass, including the polyvinyl butyral which has been added as the coating.

It is to be understood that the embodiments illustrated in the foregoing examples and that numerous other embodiments will occur to those who are skilled in the art. Thus the substrate may be a sheet of textile material or a flexible web or film of plastic, or it may be a rigid plate. Although, of course, the invention is more particularly directed to providing roughened coatings on sheets which are composed of the organic plastic compositions which are more commonly employed as safety glass interlayers. Moreover, the specific composition of the coating may be varied rather widely provided it contains an organic film-forming substance and a liquid solvent therefor. Such organic film-forming substances include polymers, copolymers, plastics, and resins, and plasticized, stabilized, and/or otherwise modified compositions thereof. Mixtures of two or more such film-forming substances may be employed and colors, fillers, pigments, dyes, and the like may be added if desired. Since the invention is particularly directed to the manufacture of embossed coated safety glass interlayers, compositions that are transparent are preferred. An endless number of these film-forming substances are known to the art and it would serve no purpose to attempt to list them here. In general, these substances include the numerous polymers of ethylenically unsaturated organic compounds such as the acrylic resins, vinyl ester polymers, and vinyl acetal polymers, styrene polymers and the like, and also the cellulose ester plastics, polyamides, and polyesters. However, other types of film-forming substances are entirely suitable for use in the present invention such as the phenol- and urea-formaldehyde resins, alkyd resins and other thermosetting resins but, when these are used, the embossing step should be conducted before the final cure to the insoluble and infusible state. A preferred group of film-forming substances are the partial polyvinyl acetal polymers among which may be mentioned polyvinyl acetaldehyde acetal, polyvinyl butyral, polyvinyl propional, polyvinyl valeral, and mixed aldehyde polyvinyl acetal polymers. Many other obviously suitable film-forming substances will readily occur to those skilled in the art.

Solvents for the various organic film-forming substances are well-known and their selection will be entirely on the basis of the usual considerations in the art without any special regard to the present invention. In the examples are illustrated several suitable solvents for the particular film-forming substances used in the examples.

The construction of the nozzle to produce droplets which impinge forcibly upon the coating is not a part of the present invention because such nozzles are readily available and are quite well-known in the art. It is necessary only that the nozzle be of the type which produces droplets large enough to be impelled against the coating, as distinguished from relatively smaller droplets which remain suspended in the atmosphere in the form of a mist or fog until the liquid of which they are composed comes in contact with a surface, or evaporates. In other words, the nozzle is not of the type which is employed in producing lacquer coatings, insecticide sprays, etc. but is of the type which produces a sprinkling effect, i. e. produces particles or droplets large enough to fall freely or to be scattered by impelling forces exerted thereon. Since water is the most suitable liquid for use in connection with such a nozzle in the practice of this invention, other more expensive fluids are generally not employed. However, any liquid which does not react with or dissolve the ingredients of the base sheet or the coating layer may be employed. Aqueous solutions of soluble salts may be used, and these include aqueous solutions of sodium chloride, sodium sulfate, sodium thiosulfate, sodium bicarbonate, potassium carbonate, potassium citrate, sodium acetate, calcium chloride, and other inorganic salts. Moreover, mixture of water methyl alcohol, ethyl alcohol, acetone, and the like, may be used. It is permissible, although not generally necessary, to employ such liquids as methyl and ethyl alcohols, ethylene glycol, other alcohols, hydrocarbon solvents such as hexane, pentane, octane, and various petroleum fractions which comprise mixtures of such compounds, and chlorinated compounds such as carbon tetrachloride, instead of water, as the liquid which produces the embossing or roughening effect.

It is preferred that the liquid employed for this purpose be miscible with at least one of the ingredients of the solvent mixture contained in the coating composition, since one of the functions of the liquid is to remove solvent from the polymeric material contained in the coating.

The coating composition is preferably applied to the base material by a spraying device which of course may be of the conventional lacquer spraying type, i. e. different from the type of device employed for effecting impingement of the droplets of the roughening liquid against the coating. Sprays produced in conventional nozzles using liquid line pressures of 5 to 120 pounds per square inch are satisfactory for use in producing the coating on the base material. The duration of such spraying may be 5 or 10 or even 15 seconds, and while the temperature is not critical, it is preferred for ease of operation to use a temperature within the range of 10° C. to 30° C.

It is to be understood that the process of this invention may be used in providing ornamental surface configurations on coated sheets, as well as for embossing or roughening coatings on safety glass interlayer sheets as hereinabove disclosed.

The succession of these steps employed in producing the coated safety glass interlayer sheeting of this invention is of critical importance. Firstly, it is essential to produce the coating upon the base material. While the said coating still contains solvent, and is therefore not completely hardened, the step of causing droplets or particles of water (or other liquid as hereinabove described) to impinge upon the coating must be carried out. The step of hardening (i. e. form-stabilization by removal of the organic solvent) must take place either simultaneously with the embossing or roughening effect, or subsequently thereto.

The coated safety glass interlayer sheeting embossed or roughened by the method of this invention is non-tacky, and is particularly adaptable to lamination procedures now in commercial use. The surface configuration of coated sheets embossed or roughened by the method of this invention is relatively uniform, and the invention may therefore be used not only for the production of useful effects in the manufacture of safety glass, but also in the production of useful ornamental effects and for reducing the adhesive properties of films in applications other than in the production of safety glass.

As many apparently widely different embodiments of this invention may be made without departing from the spirit and scope thereof, it is to be understood that the invention is not limited to the specific embodiments thereof herein illustrated.

I claim:
1. In a process for making safety glass, the steps which comprise coating both surfaces of an interlayer sheet of polyvinyl butyral resin containing a water-insoluble plasticizer therefor, with a liquid comprising polyvinyl butyral resin dissolved in ethanol and containing also a plasticizer which is the same as the plasticizer present in the interlayer, causing a shower of water droplets to impinge forcibly on the resulting coated surfaces, whereby the coating remains continuous but acquires a roughened surface, and thereafter hardening the said roughened surface by soaking it in water until the ethanol has been leached away therefrom, drying the resultant embossed sheet and laminating the coated embossed sheet between glass plates.

2. The process of claim 1 wherein the plasticizer is di(butoxyethyl)adipate.

References Cited in the file of this patent

UNITED STATES PATENTS

| Number | Name | Date |
|---|---|---|
| Re. 21,045 | Bright | Apr. 11, 1939 |
| 1,011,181 | Galay | Dec. 12, 1911 |
| 1,353,599 | Lovell | Sept. 21, 1920 |
| 1,674,403 | Lilienfeld | June 19, 1928 |
| 2,113,767 | Paggi | Apr. 12, 1938 |
| 2,162,678 | Robertson | June 13, 1939 |
| 2,510,966 | Flanagan | June 13, 1950 |

FOREIGN PATENTS

| Number | Country | Date |
|---|---|---|
| 507,138 | Great Britain | June 7, 1939 |